United States Patent [19]
Aoki

[11] Patent Number: 4,965,693
[45] Date of Patent: Oct. 23, 1990

[54] ELECTRICAL APPLIANCE WITH ELECTRICAL HAZARD PROTECTION

[75] Inventor: Kazuhisa Aoki, Hikone, Japan

[73] Assignee: Matsushita Electric Works, Ltd., Japan

[21] Appl. No.: 435,761

[22] Filed: Nov. 14, 1989

[30] Foreign Application Priority Data

Nov. 15, 1988 [JP] Japan .................................. 63-288193

[51] Int. Cl.$^5$ .............................................. H02H 3/16
[52] U.S. Cl. ...................................... 361/42; 307/118; 307/326; 200/61.05
[58] Field of Search ........................ 361/42, 47, 50, 87, 361/93, 178; 200/51.06, 61.04, 61.05, 61.06; 307/326, 118; 324/561

[56] References Cited
U.S. PATENT DOCUMENTS 4,270,158 5/1981 Gilardoni et al. ...................... 361/42
4,687,906 8/1987 Fujishima et al. ................. 361/42 X
4,709,293 11/1987 Gershen et al. ........................ 361/50

Primary Examiner—Derek S. Jennings
Attorney, Agent, or Firm—Stevens, Davis, Miller & Mosher

[57] ABSTRACT

An improved electrical appliance with short-circuit hazard protection includes a plug unit adapted to be connected to a source of electricity and a feed cord extending from the plug unit to the electrical appliance for supplying electric current thereto. The feed cord has a connector terminal by which the feed cord is rotatably or detachably coupled to the appliance. The appliance incorporates a first hazard sensor which detects an electrical hazard or short-circuit condition caused by moisture, water, or the like conductive medium. The plug units includes an interrupting circuit which disconnects the feed cord from the source of electricity in response to the detection of the hazard condition. The connector terminal of the feed cord is provided also with a second hazard sensor which detects a like hazard condition caused around the connector terminal and actuates the common interrupting circuit to disconnect the feed cord from the source of electricity, whereby assuring protection against such electrical hazard even when the connector terminal alone is exposed to the hazard condition.

12 Claims, 8 Drawing Sheets

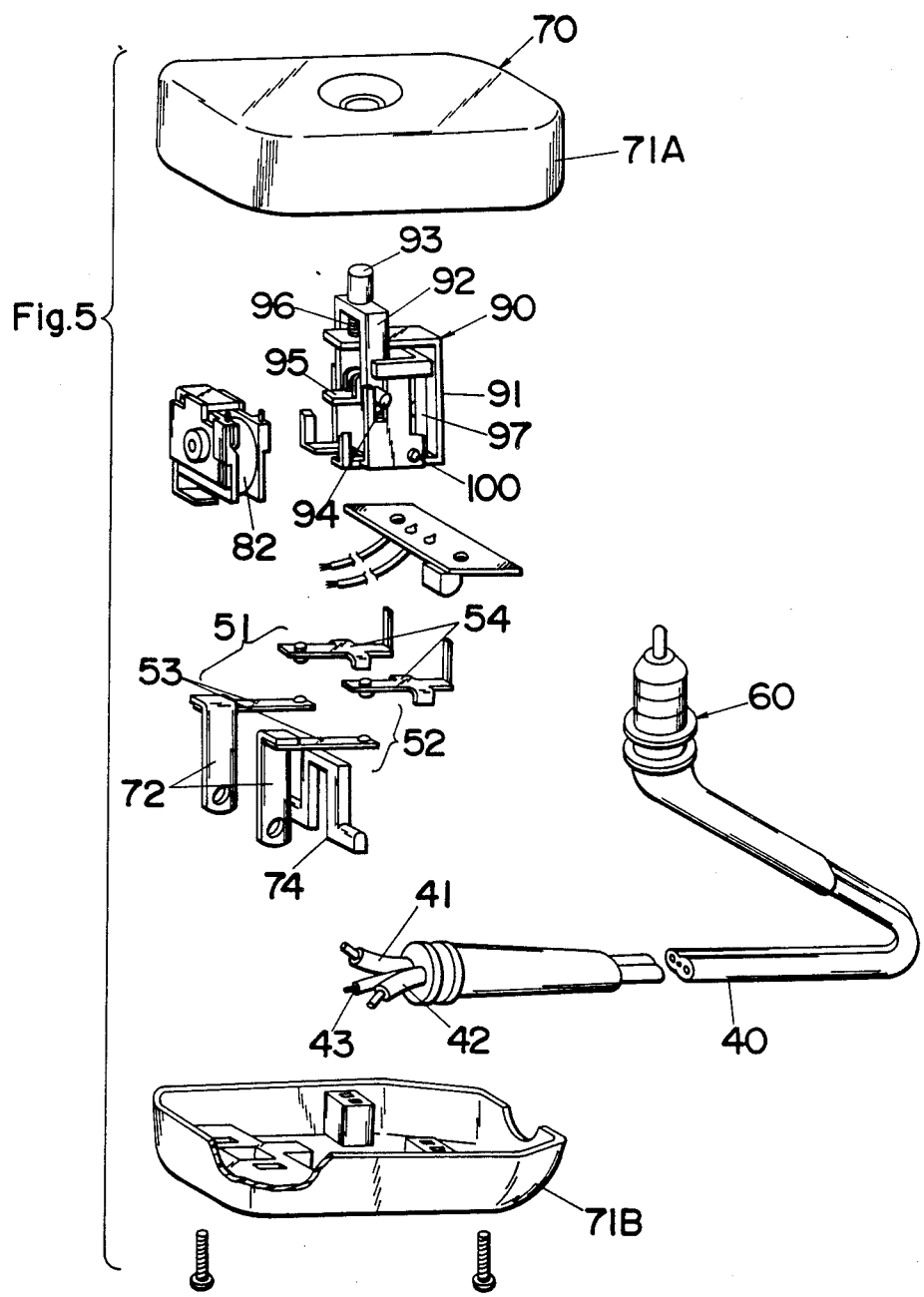

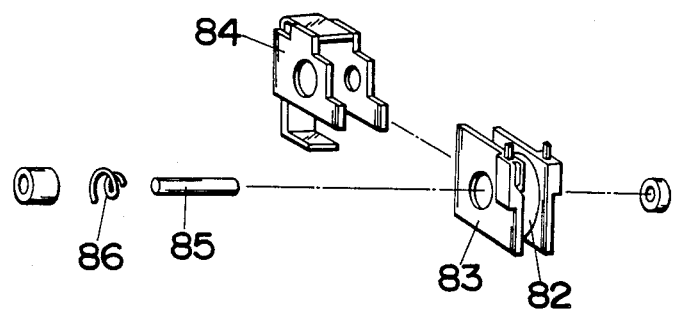
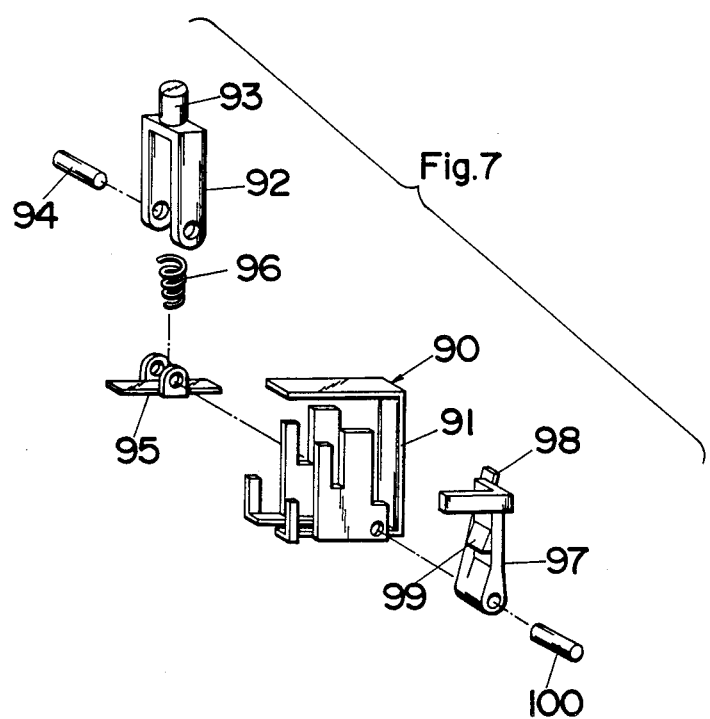

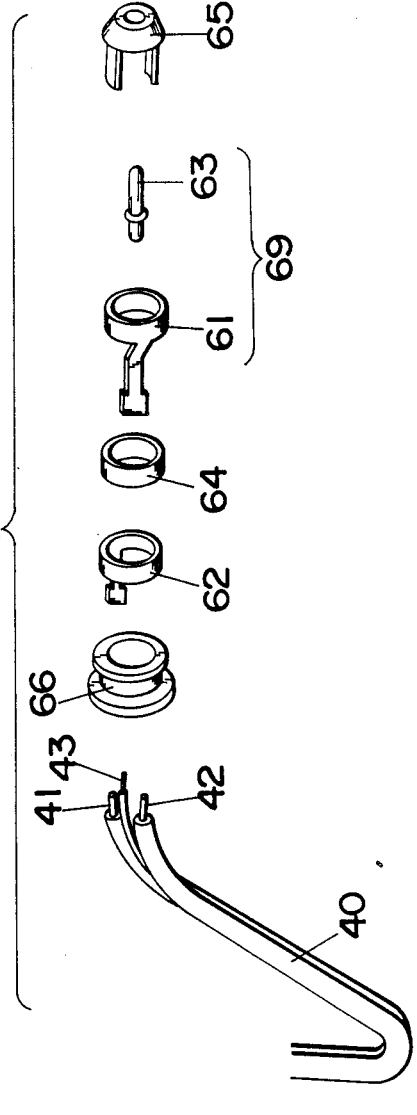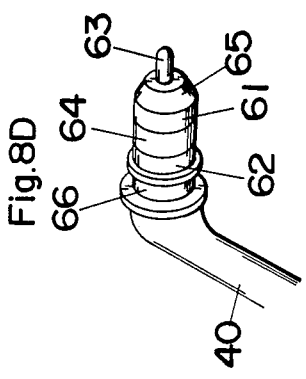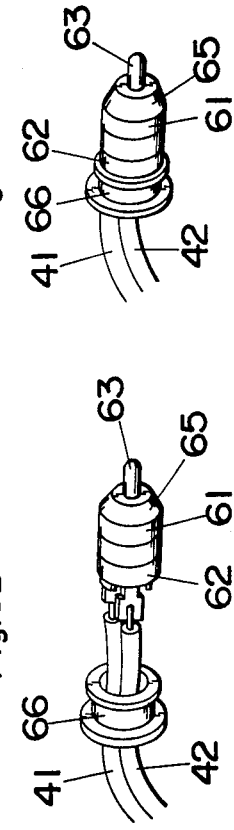

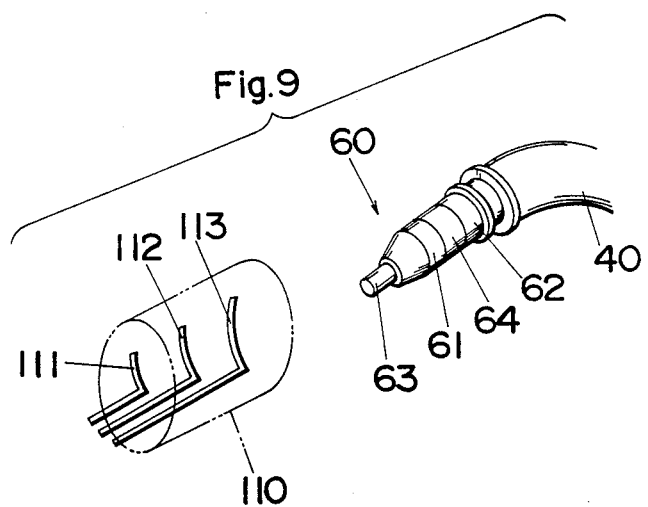

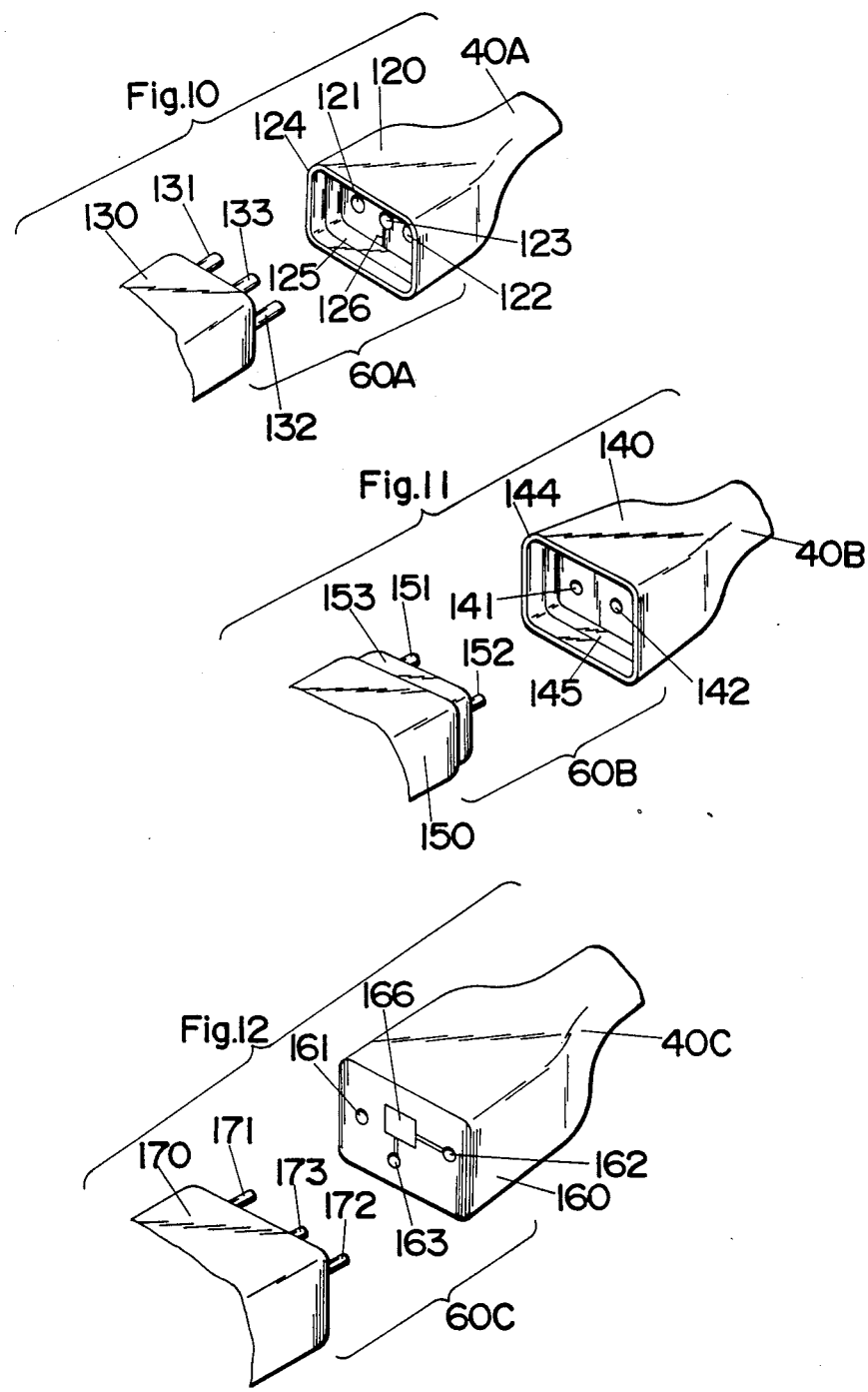

ELECTRICAL APPLIANCE WITH ELECTRICAL HAZARD PROTECTION

BACKGROUND OF THE INVENTION

1. Field of the Invention

The present invention is directed to an electrical appliance with electrical hazard protection, and more particularly to such an electric appliance which is connected to a source of electricity by means of a feed cord having a connector swivelled or detachable to the appliance.

2. Description of the Prior Art

Electrical appliances with electrical shock hazard protection have been proposed in the art, as disclosed in U.S. Pat. Nos. 4,270,158 and 4,709,293. The prior appliance is designed to have in itself one or more hazard sensors which detect a short-circuit condition caused by the presence of moisture, water, and the like conductive medium between exposed conductors in the electrical appliance to thereby interrupt the feeding of electric current to the appliance. Thus, the appliance can be made safe against potential electrical shocks when the appliance is immersed in water or subjected to like conductive environment. Further, for reliably detecting such hazard condition, the prior appliance contemplates to arrange the hazard sensor in the vicinity of an opening which is required for effecting the function of the appliance, that is, an inlet and outlet openings in a hair dryer illustrated as a typical embodiment in the above patents. However, a serious problem is encountered when using a feed cord which has a connector swivelled or detachable to the appliance, since such connector includes inherently exposed terminals for energizing the appliance and therefore has a potential hazard of short-circuiting between the exposed terminals.

SUMMARY OF THE INVENTION

The above problem is eliminated in the present invention which provides an improved electrical appliance with electrical hazard protection. The electrical appliance of the present invention includes a plug unit adapted to be connected to a power source such as a wall outlet or the like electrical receptacle. Extending from the plug unit is a feed cord which terminates at a connector detachable or swivelled to the appliance. The appliance includes a first hazard sensor which detects an electrical hazard condition to which the appliance itself is subjected. The plug unit incorporates a power interrupting circuit which, in response to the hazard condition detected by the first hazard sensor, disconnects the appliance electrically from the plug unit. The connector is provided with a second hazard sensor which detects like hazard conditions around the connector and is likewise associated with the power interrupting circuit to disconnect the connector or the feed cord itself from the power source, whereby enhancing the safety against electric shock. That is, even when only the portion around the connector of the feed cord is exposed to water while the appliance is not, the interrupting circuit can operate to interrupt the current feeding to the connector or the feed cord, successfully protecting personnel from the electrical hazard. This is particularly important and advantageous when the connector is made detachable from the appliance since the connector itself may accidentally fall into water such as in a bathtub and would otherwise causes a serious electrical hazard.

Accordingly, it is a primary object of the present invention to provide an improved electrical appliance with electrical hazard protection which is capable of interrupting the current feeding to the appliance and the feed cord in response to the detection of a short-circuit condition at the electrical appliance itself and also at the connector of the feed cord.

In one version of the present invention, the connector of the feed cord is in the form of a swivel shaft rotatably coupled to an appliance housing. The swivel shaft includes a set of first and second conductor terminals which are electrically coupled to corresponding leads of the appliance for energization thereof and which are exposed on the swivel shaft for slidable contact with the corresponding leads in the appliance during the rotational movement of the swivel shaft. Also included in the swivel shaft is a third conductor which is exposed on the swivel shaft and cooperative with one of the first and second conductors to form the second hazard sensor. That is, the third conductor defines a conductive or short-circuit path with one of the first and second conductors such that the thus formed second hazard sensor acknowledges the hazard condition when the path is bridged or completed by moisture, water, or like conductive medium entering around the connector.

It is therefore another object of the present invention to provide an improved electrical appliance with electrical hazard protection which includes a feed cord swivelled to the appliance and is capable of detecting an electrical hazard condition at the swivel connection to ensure a protection against the shock hazard thereat.

The third conductor is preferably in the form of a pin projecting in an axial direction of the swivel shaft, while the first and second conductors are in the form of rings arranged around the swivel shaft. For positively detecting a short-circuit condition present around the connector, a frustoconical insulating member is interposed between the third conductor pin and the adjacent first conductor ring to provide a tapered surface leading from the first conductor ring to the third conductor pin in order to facilitate the bridging therebetween by moisture, water, or the like conductive medium coming around the swivel shaft.

It is therefore a further object of the present invention to provide an improved electrical appliance with electrical hazard protection which is capable of reliably and positively detecting a short-circuit condition present around the swivel connector.

In another version of the present invention, the feed cord has a connector detachable from the appliance. The connector is provided in the form of a female coupling associated with a male coupling correspondingly formed in one end of the appliance. The female coupling includes first and second conductors supplying electric current from the power source to the appliance. The first and second conductors are arranged within individual holes open to a mating surface of the female coupling with the male coupling. The male coupling has a set of pin leads for insertion into the holes for electrical connection of the feed cord to the appliance. The female coupling further includes a third conductor which is also exposed on the mating surface and is cooperative with one of the first and second conductors to define the second hazard sensor. When the female coupling is detached from the male coupling, the thus formed second hazard sensor provides between the third conductor and one of the first and second conductors a short-circuit path which can be readily bridged by the conductive medium, for example, water to which the male coupling is exposed. In response to such hazard condition detected at the female coupling or the connector of the feed cord, the power interrupting circuit operates to electrically disconnect the female coupling from the power source.

It is therefore a further object of the present invention to provide an improved electrical appliance with electrical hazard protection which includes a detachable feed cord and is capable of interrupting the current feeding to the cord even when the connector is detached from the appliance and is alone subjected to the conductive medium.

The female coupling is shaped to have a flange extending from the periphery of the mating surface and to include an electrode extending around the inner surface of the flange. The electrode is connected to the third conductor and has an enlarged exposed surface for increasing sensitivity of detecting the hazard condition, which is therefore a still further object of the present invention.

Further, the female coupling may have a humidity sensor which is exposed to the mating surface and connected between the third conductor and one of the first and second conductors. The humidity sensor shows a considerable electrical resistance in the absence of moisture or water to thereby maintaining these conductors isolated, but it shows a remarkably decreased resistance when contacted with moisture or water to thereby short-circuit these conductors and therefore detect the electrical hazard condition.

Also in the present invention, the third conductor is connected through the connector either in the form of swivel shaft or female coupling to one or more electrodes which are disposed adjacent to individual conductive elements of the appliance to define therewith the first hazard sensor. Thus, the third conductor is utilized as a common line for the first and the second hazard sensors, simplifying the circuit arrangement of the appliance.

These and still other object and advantageous features of the present invention will become more apparent from the following description of the preferred embodiments when taken in conjunction with the attached drawings.

BRIEF DESCRIPTION OF THE DRAWINGS

FIG. 5 is an exploded perspective view of the plug unit;

FIG. 6 is an exploded perspective view of a plunger block incorporated in the plug unit;

FIG. 7 is an exploded perspective view of a trip block incorporated in the plug unit;

FIG. 8, composed of FIGS. 8A to 8D, illustrates an assembly of a swivel shaft provided at one end of a feed cord extending from the plug unit;

FIG. 9 is an exploded perspective view of the swivel shaft and an associated socket in the dryer housing; and FIGS. 10 to 12 are exploded perspective views respectively illustrating detachable connectors of different types provided in accordance with the other preferred embodiments of the present invention.

DETAILED DESCRIPTION OF THE PREFERRED EMBODIMENTS

Figure 1:
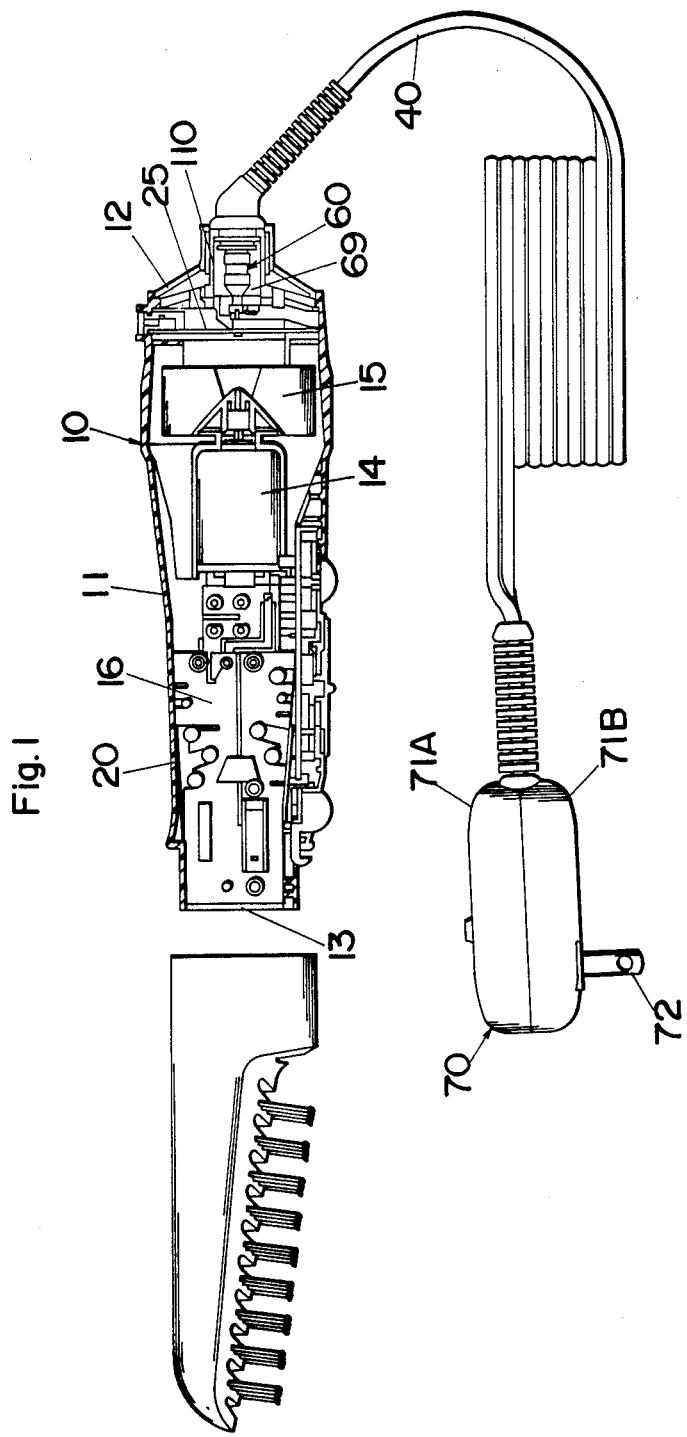
FIG. 1 is an elevation, partly in section of a hair dryer provided with an electrical hazard protection in accordance with a preferred embodiment of the present invention.
Figure 2:
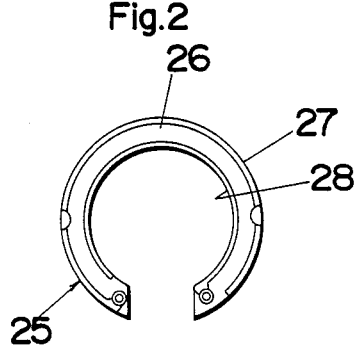
FIG. 2 is a front view of a hazard sensor provided in the rear end of a dryer housing.

Referring to FIG. 1, there is shown a hair dryer as one typical electrical appliance, but not necessarily limited thereto, with an electrical hazard protection in accordance with a preferred embodiment of the present invention. The hair dryer comprises a dryer body 10, a feed cord 40, and a plug unit 70. The dryer body 10 is of a conventional design including an elongated cylindrical housing 11 with inlet and outlet openings 12 and 13 at the rear and front ends thereof. The housing 11 accommodates an electric motor 14, a fan 15, and a heater 16, which are also conventional and further explanation thereof are deemed unnecessary. The dryer body 10 is provided with a pair of front and rear hazard sensors 20 and 25 which are disposed in adjacent relation respectively to the inlet and outlet openings 12 and 13. The front sensor 20 is in the form of a cylindrical electrode disposed around the heater 16 in adjacent relation with a conductive element or resistive element of the heater 16 in such a way as to define therebetween a path which can be short-circuited or bridged by moisture, water, or the like conductive medium entering around the heater 16 through the outlet opening 12 when, for example, the front portion of the dryer body 10 falls into water. The rear hazard sensor 25 is fitted within the rear end of the housing 11 immediately inwardly of the inlet opening 12 and comprises, as shown in FIG. 2, an insulator ring 26, a pair of outer and inner electrodes 27 and 28 extending circumferentially around the outer and inner peripheries of the insulator ring 26. These outer and inner electrodes 27 and 28 define therebetween a like short-circuit path which can be bridged by moisture, water, and the like conductive medium entering into dryer body 10 through the rear inlet opening 12. The outer electrode 27 is electrically connected to the electrode of the front sensor 20 by means of a suitable wiring (not shown) routed within the housinq 11, while the inner electrode 28 is electrically connected to an energized line of the heater 16 or the motor 14 so as to have a relation equivalent to that between the electrode of the front hazard sensor 20 and the resistive heater element of the heater 16. The front and rear hazard sensors 20 and 25 thus formed are connected through the feed cord 40 to a power interrupting circuit within the plug unit 70 for transmitting a signal indicative of the short-circuit or electrical hazard condition detected at either of the front and rear sensor.

Figure 3:
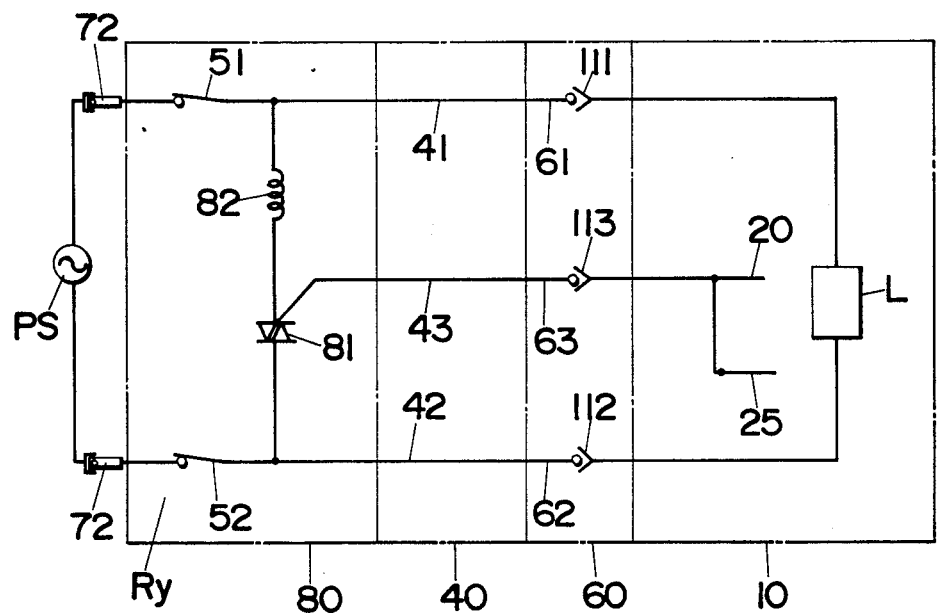
FIG. 3 is a circuit diagram illustrating a hazard protection system of the hair dryer.

The plug unit 70 has a set of blades 72 which are to be inserted into slots of a conventional receptacle such as a wall outlet for energizing the load or the hair dryer. The blades 72 project from a plug housing 71 composed of two halves 71A and 71B and are connected to first and second wires 41 and 42 of the feed cord 40 respectively through first and second switch contacts 51 and 52, as shown in FIG. 5. The feed cord 40 extends from within the plug unit 70 and terminates at a swivel connector 60 which is rotatably coupled at the rear end of the dryer body 10. In addition to the first and second wires 41 and 42, the feed cord 40 includes a third wire or sensor wire 43 which interconnects the hazard sensors 20 and 25 to the interrupting circuit 80 through the swivel connector 60. The interrupting circuit includes, as shown in FIG. 3, the first and second switch contacts 51 and 52, and a triac 81 which is connected in series with an excitation coil 82 between the first and second wires downstream of the switch contacts and which has a gate terminal connected to the third wires 43 and therefore to the corresponding electrodes of the hazard sensors 20 and 25 of the dryer body 10 through the swivel connector 60. The excitation coil 82 is cooperative with the switch contacts 51 and 52 to construct a relay Ry which, in response to the energization of the coil 82, to open the switch contacts 51 and 52 simultaneously for interrupting of the current feeding from an alternative current power source PS to the feed cord 40 and therefore the dryer body 10. That is, when any one of the front and rear sensors 20 and 25 detects an electrical hazard condition, the third wire 43 sees a short-circuit current from one of the first and second wires 41 and 42, which current is fed to the gate of triac 81 to make it conductive, whereby energizing the coil 82 to open the switch contacts 51 and 52.

Figure 4:
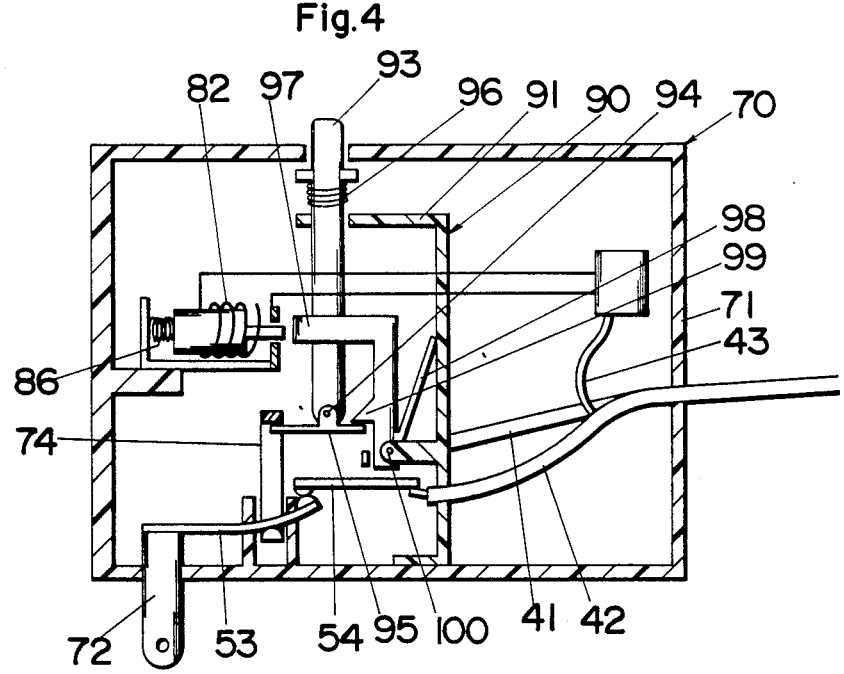
FIG. 4 is a sectional view of a plug unit of the hair dryer.

As shown in FIG. 5, the first and second switch contacts 51 and 52 have identical construction and are each composed of a movable contact carrier 53 connected at one end to the blade 72 and a stationary contact carrier 54 held in a fixed position within the plug unit 70. The movable contact carrier 53 is a leaf spring which is, as shown in FIG. 4, lifted against its spring bias by a hanger 74 into a closed position with the stationary contact carrier 54 and is retained in this position by means of a trip mechanism 90 in the absence of an electrical hazard condition. The trip mechanism 90 includes a frame 91 supporting a vertical slider 92 and a rocker 97 with a spring leg 98. The vertical slider 92, which is urged upwardly by a return spring 96 interposed between the upper end of the slider 92 and the upper end of the frame 91, defines on its upper end a reset button 93 and has at its lower end a pivot pin 94 for pivotally supporting a flap 95. The flap 95 is engaged at its one end with the top end of the hanger 74 and at the other end with a latch projection 99 of the rocker 97. The rocker 97 is of a generally L-shaped configuration having a vertical segment and a horizontal segment and is pivotally supported at the lower end of the vertical segment by means of a pin 100 to the frame 91. The spring leg 98 extends upwardly from the lower end of the rocker 97 and abuts against the frame 91 in order to bias the rocker 97 in the counterclockwise direction about the pin 100, as seen in FIG. 4, keeping the flap 95 engaged with the latch projection 99 to thereby retain the switch contacts 51 and 52 in closed positions.

The excitation coil 82 is, as best shown in FIG. 6, held around a coil bobbin 83 and assembled into a coil frame 84. A plunger 85 extends through the coil bobbin 83 and is biased by a spring 86 for abutment at its one end against the end of horizontal segment of the rocker 97, as shown in FIG. 4. When the coil 82 is energized in response to the detection of an electrical hazard condition in the dryer body 10, the plunger 85 pushes the horizontal segment of the rocker 97 to rotate it about the pin 100 against the bias of the spring leg 98 in the clockwise direction, as seen in FIG. 4, thereby disengaging the one end of the flap 95 from the latch projection 99 and therefore making the flap 95 free to rotate about the pivot pin 94. Upon this occurrence, the hanger 74 is released to move downward by the return spring force of the movable contact carriers 53 with the other end of the flap 95 retained by the hanger 74, thereby allowing the movable contact carriers 53 to be disengaged from the corresponding stationary contact carriers 54, thus electrically disconnecting the dryer body 10 or the feed cord 40 from the power source PS. Simultaneously, the vertical slider 92 is forced to move upwardly by the return spring 96 to project the reset button 93 above the plug unit 70. Resetting of the switch contacts 51 and 52 is made by pushing the reset button 93 downward. That is, when the vertical slider 92 is forced to move downward, the flap 95 pivots in such a manner as to make the one end of the flap 95 ride over the latch projection 99 as pivoting the rocker 97 against the bias of the spring leg 98 and to have the one end of the flap 95 again latched behind the latch projection 99, during which the flap 95 pivots about the pin 94 to pull the hanger 74 upward by the other end of the flap 95, thereby forcing both the movable contact carriers 53 into closed positions with the corresponding stationary contact carriers 54 and reestablishing the electrical connection between the power source PS and the feed cord 40.

The swivel connector 60, which is formed at the end of the feed cord 40 for rotatable connection with a corresponding socket 110 of the dryer body 10, comprises first, second and third terminal conductors 61, 62, and 63, as best shown in FIG. 8. The first and second terminal conductors 61 and 62 are in the form of spaced rings wired respectively to the first and second wires 41 and 42 and spaced axially by an insulator ring 64 disposed therebetween. The third terminal conductor 63 is provided in the form of a pin extending axially through an insulating tip holder 65 of frustoconical configuration and supported thereby in a spaced relation with the first and second terminal conductors 61 and 62. It is this third terminal conductor 63 that is cooperative with the first terminal conductor 61 (or the second terminal conductor 62) to form a connector hazard sensor 69 for detecting like electrical hazard condition which may be seen around the swivel connector 60. That is, when the swivel connector 60 is exposed to moisture, water, or the like conductive medium, a short-circuit path is established between the third terminal conductor 63 and the first conductor 61 to thereby provide a short-circuit current to the gate of triac 81 through the third wire 43, whereby energizing the coil 82 to disconnect the feed cord 40 as well as the dryer body 10 from the power source. It is noted at this point that the frustoconical tip holder 65 provides a tapered surface leading from the first conductor ring 61 to the third conductor pin 63 so that a drop of water can readily bridge the first and third conductors 61 and 63 for positive and reliable detection of the electrical hazard condition. Also included in the swivel connector 60 is a grooved collar 66 which is rotatably received in the socket 110 at the rear end of the dryer body housing 11. As shown in FIG. 9, the socket 110 is provided on its interior with a set of first, second, and third leads 111, 112, and 113 which are held in contact respectively with the first, second, and third terminal conductors 61, 62, and 63. As apparent from the previous description, the first and second leads 111 and 112 are connected to a load L of the dryer for energization thereof, while the third lead 113 is connected to the front and rear hazard sensors 20 and 25. Thus, the sensors 20 and 25 in the dryer body 10 and the connector hazard sensor 69 are connected to the interrupting circuit 80 by way of the common third wire 43 of the feed cord 40. Although in the above embodiment, the swivel connector 60 is illustrated to be provided at the end of the feed cord 40 and held rotatably within the socket 110 of the dryer body 10, it may be conversely provided within the dryer body 10 and detachable to a suitable socket provided at the end of the feed cord 40. In such a case, the socket of the feed cord can have a like connector hazard sensor which detects an electrical hazard condition, even when it is detached from the dryer body and is accidentally dropped into water.

FIGS. 10 to 12 illustrate other embodiments of the present invention which are identical in configuration to the above embodiment except that the feed cord is detachable from the dryer body through connectors of different types. In the embodiment of FIG. 10, the connector 60A comprises a female coupling 120 at the end of the feed cord 40A and a male coupling 130 provided at the end of the dryer housing 11A. The female coupling 120 has a set of first, second, and third holes 121, 122, and 123 which are made of conductive material and wired respectively to the first, second, and third wires of the feed cord 40A. These holes are open to a mating surface thereof with the third hole 123 arranged between the first and second holes 121 and 122. The male coupling 130 comprises a corresponding set of first, second, and third pins 131, 132, and 133 Which are to be inserted into the first, second, and third holes 121, 12, and 123 for electrical connection thereto. Likewise in the previous embodiment, the first and second pins 131 and 132 are connected to the load of the dryer, while the third pin 133 is to one or more hazard sensors (not shown) provided in the dryer body. Extending from the periphery of the mating surface of the female coupling 120 is a flange 124 which is fitted over the end portion of the male coupling 130 and Which is provided on its inner surface with a band electrode 125 connected through a segment 126 to the third holes 123 or third wires of the feed cord so that the band electrode 125 as well as the conductor of the third hole 123 can define a like connector hazard sensor with the conductor of either of the first hole 121 or second hole 122. Thus defined connector hazard sensor effects the hazard detective operation in the same manner as in the previous embodiment, but has the enlarged electrode 125 exposed for reliable detection of the hazard condition particularly when the female coupling 120 is alone dropped into water.

In the embodiment of FIG. 11, the connector 60B comprises a female coupling 140 and a male coupling 150. The female coupling 140 includes a pair of first and second holes 141 and 142 connected respectively to the first and second wires of the feed cord 40B. Likewise in the embodiment of FIG. 10, a flange 144 is formed at the end of the female coupling 140 to have a like band electrode 145 which is connected internally to the third wires of the feed cord 40B. The male coupling 150, on the other hand, includes a pair of first and second pins 151 and 152 connected to the load of the dryer body and adapted to be inserted into the first and second holes 141 and 142. Extending around the end of the male coupling 150 is a conductor lead 153 which is connected internally to one or more hazard sensors in the dryer body and comes in contact with the electrode 145 of the female coupling 140 for electrically connecting of the hazard sensors in the dryer body to the third wire of the feed cord 40B. In this embodiment, the enlarged electrode 145 exposed on the female coupling 140 can also define a like connector hazard sensor with the either conductor of the first hole 141 or the second hole 142.

In the embodiment of FIG. 12, the connector 60C comprises a female coupling 160 with a set of first, second, and third holes 161, 162, and 163 respectively connected to the first, second, and third wires of the feed cord 40C. A male coupling 170 has a corresponding set of first, second, and third pins 171, 172, and 173 which are respectively connected internally to the load and hazard sensor within the dryer body and which are to be inserted respectively into the first, second, and the third holes 161, 162, and 163 of the female coupling 160. Exposed on the mating surface of the female coupling 160 is a humidity sensor 166 electrically connected between the third hole 163 and the second hole 162 (alternatively the first hole). The humidity sensor 166 is characterized to have electric resistance decreasing remarkably when subjected to a wet environment such that the second and third holes 162 are short-circuited upon detection of the wet condition by the humidity sensor 166 to thereby transmit through the third wire of the feed cord 40C a signal indicative of a hazard detection, causing the interrupting circuit to disconnect the feed cord 40C from the power source, in the manner as described hereinbefore. As apparent from the embodiments of FIGS. 10 to 12, the connector hazard sensor can operate to electrically disconnect the feed cord itself from the power source when the electrical hazard condition is detected around the connector, enhancing the protection against the electric shock hazard even when the female coupling is detached from the dryer body and is alone dropped into water or exposed to the like conductive medium.

What is claimed is:

1. In an electrical appliance with short-circuit hazard protection comprising:
   a plug unit connected to a source of electricity;
   a feed cord extending from said plug unit to feed an electric current to said electrical appliance;
   first hazard sensor means provided within said appliance to detect an electrical hazard condition or short-circuiting condition caused by the presence of moisture, water, or like conductive medium entering said appliance;
   interrupting circuit means provided within said plug unit, said interrupting circuit means connected to said first hazard sensor means and operating to disconnect said appliance from said source of electricity in response to the detection of said electrical hazard condition;
   the improvement comprising:
   said feed cord provided at its one end with a connector terminal including a set of first, second, and third conductors, said first and second conductors respectively connected to corresponding leads in said electrical appliance for energizing said, appliance, and said third conductor cooperating with at least one of said first and second conductors to form second hazard sensor means which detects a like electrical hazard condition around said connector terminal by the presence of moisture, water, or like conductive medium and which causes said interrupting circuit means to disconnect said feed cord from said source of electricity.

2. An improved electrical appliance as set forth in claim 1, wherein
   said connector terminal is provided in the form of a swivel shaft rotatably received in a corresponding socket formed in said appliance, said swivel shaft having on its exterior surface said first and second conductors in spaced relation along an axis of said swivel shaft, said third conductor extending axially in spaced relation to said first and second conductors to form said second hazard sensor means with one of said first and second conductors, said second hazard sensor means providing a short-circuit path which can be bridged by moisture, water, or like electrically conductive medium between said third conductor and one of said first and second conductors in order to transmit a short-circuit signal upon conduction of said short-circuit path to said interrupting circuit means, whereby actuating said interrupting circuit means to disconnect said connector terminal from the source of electricity.

3. An improved electrical appliance as set forth in claim 2, wherein
said appliance further includes at least one electrode which is coupled through said connector terminal to said third conductor, said electrode being positioned in an adjacent relation to a conductive element coupled through said connector terminal to one of said first and second conductors so as to form therebetween a conductive path which can be bridged by moisture, water, or the like conductive medium for transmitting a like short-circuit signal to said interrupting circuit means upon conduction of said short-circuit path, whereby actuating said interrupting circuit means to interrupt the feeding of the electricity to said appliance.

4. An improved electrical appliance as set forth in claim 2, wherein
said interrupting circuit means comprises a relay having a set of normally closed switch contacts each connected in series with each of said first and second conductors, and a triac connected between said first and second conductors at a portion downstream of said switch contacts,
said relay including an excitation coil in series with said triac between said first and second conductors,
said triac having a gate connected to said third conductor such that said triac is made conductive, upon said short-circuiting between said third conductor and one of said first and second conductors, to energize said excitation coil in the direction of opening said switch contacts.

5. An improved electrical appliance as set forth in claim 2, wherein
said third conductor defining the axis of said swivel shaft is spaced from said first conductor by a frustoconical piece of insulating material, said frustoconical piece providing a tapered surface leading from said first conductor to said third conductor.

6. An improved electrical appliance as set forth in claim 1, wherein
said connector terminal is provided in the form of a female coupling detachably connected to a male coupling correspondingly formed in one end of said appliance, said female coupling including said first and second conductors arranged within individual spaced holes, and including said third conductor;
said male coupling including said leads in the form of pins detachably inserted to each of said holes; said first and second conductors in said holes and third conductor being exposed to a mating surface of said female coupling with said male coupling such that said third conductor forms said second hazard sensor means with one of said first and second conductors,
said second hazard sensor means providing, when said female coupling is detached from said male coupling, a short-circuit path which can be bridged by moisture, water, or like electrically conductive medium between said third conductor and on of said first and second conductors in order to transmit a short-circuit signal upon conduction of said short-circuit path to said interrupting circuit means, whereby actuating said interrupting circuit means to disconnect said connector terminal from the source of electricity.

7. An improved electrical appliance as set forth in claim 6, wherein
said appliance further includes at least one electrode which is coupled through said connector terminal to said third conductor, said electrode being positioned in an adjacent relation to a conductive element coupled through said connector terminal to one of said first and second conductors so as to form therebetween a conductive path which can be bridged by moisture, water, or like conductive medium for transmitting a like short-circuit signal to said interrupting circuit means upon conduction of said short-circuit path, whereby actuating said interrupting circuit means to interrupt the feeding of the electricity to said feed cord and to said appliance.

8. An improved electrical appliance as set forth in claim 6, wherein
said interrupting circuit means comprises a relay having a set of normally closed switch contacts each connected in series with each of said first and second conductors, and a triac connected between said first and second conductors at a portion downstream of said switch contacts,
said relay including an excitation coil inserted in series with said triac between said first and second conductors,
said triac having a gate connected to said third conductor such that said triac is made conductive, upon said short-circuiting between said third conductor and one of said first and second conductors, to energize said excitation coil in the direction of opening said switch contacts.

9. An improved electrical appliance as set forth in claim 6, wherein
said third conductor is also arranged within a corresponding hole in adjacent relation to said holes of said first and second conductors, and wherein said female coupling is shaped to have a flange projecting from the periphery of said mating surface, said flange including a terminal electrode which is exposed on the inner surface of said flange and electrically connected to said third conductor such that said terminal electrode is also cooperative with one of said first and second conductors to form said second hazard sensor means.

10. An improved electrical appliance as set forth in claim 6, wherein
said female coupling is shaped to have a flange projecting from the periphery of said mating surface, said third conductor extending along the inner surface of said flange to define thereat at a terminal electrode exposed in adjacent relation to at least one of said first and second conductors to thereby define therewith said second hazard sensor means.

11. An improved electrical appliance as set forth in claim 9, wherein
said terminal electrode is in the form of a loop extending around the inner periphery of said flange.

12. An electrical appliance as set forth in claim 6, wherein
said female coupling includes a humidity sensor exposed on said mating surface and interconnecting said third conductor and one of said first and second conductors, said humidity sensor exhibiting decreased electrical resistance when subjected to moisture or water to thereby cause the short-circuiting between said third conductor and the one of said first and second conductors.

* * * * *